US012654168B2

(12) United States Patent
Wheeler et al.

(10) Patent No.: US 12,654,168 B2
(45) **Date of Patent: *Jun. 16, 2026**

(54) GASKETS FOR THE DISTRIBUTION OF PRESSURES IN A MICROFLUIDIC SYSTEM

(71) Applicant: 10x Genomics, Inc., Pleasanton, CA (US)

(72) Inventors: Tobias Daniel Wheeler, Pleasanton, CA (US); Rajiv Bharadwaj, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 17/563,645

(22) Filed: Dec. 28, 2021

(65) Prior Publication Data

US 2022/0193667 A1 Jun. 23, 2022

Related U.S. Application Data

(63) Continuation of application No. 16/704,610, filed on Dec. 5, 2019, now Pat. No. 11,241,688, which is a (Continued)

(51) Int. Cl.
*B01L 99/00* (2010.01)
*B01L 3/00* (2006.01)

(52) U.S. Cl.
CPC ..... *B01L 3/502715* (2013.01); *B01L 3/50273* (2013.01); *B01L 2200/0689* (2013.01); *B01L 2300/14* (2013.01)

(58) Field of Classification Search
None
See application file for complete search history.

(56) References Cited

U.S. PATENT DOCUMENTS 4,948,442 A * 8/1990 Manns ................ B01L 3/50255 422/534
10,337,061 B2 7/2019 Hindson et al.
(Continued)

FOREIGN PATENT DOCUMENTS

EP 3013957 B1 9/2018
WO WO-00/070095 A2 11/2000
(Continued)

OTHER PUBLICATIONS

Machine Translation of WO 2015/178413 (Year: 2015).*
(Continued)

*Primary Examiner* — Paul S Hyun
(74) *Attorney, Agent, or Firm* — Clark & Elbing LLP

(57) ABSTRACT

A microfluidic system includes a microfluidic chip having a plurality of fluid channels, each fluid channel having an opening providing access to an interior of the fluid channel, and a gasket disposable on the microfluidic chip in an aligned configuration, the gasket including a first side configured to face the microfluidic chip in the aligned configuration, a second side opposite the first side, and an aperture extending through the gasket from the first side to the second side, the aperture being sized and positioned to allow a communication of pressure from the second side of the gasket to the openings of at least two fluid channels when the gasket is in the aligned configuration.

27 Claims, 8 Drawing Sheets

Related U.S. Application Data continuation of application No. PCT/US2018/035774, filed on Jun. 4, 2018.

(60) Provisional application No. 62/515,236, filed on Jun. 5, 2017.

(56) References Cited

U.S. PATENT DOCUMENTS

| | | | |
|---|---|---|---|
| 10,450,607 B2 | 10/2019 | Hindson et al. | |
| 10,457,986 B2 | 10/2019 | Hindson et al. | |
| 10,480,028 B2 | 11/2019 | Hindson et al. | |
| 10,480,029 B2 | 11/2019 | Bent et al. | |
| 10,557,158 B2 | 2/2020 | Hardenbol et al. | |
| 11,241,688 B2 | 2/2022 | Wheeler et al. | |
| 2002/0110902 A1 | 8/2002 | Prosser et al. | |
| 2002/0119544 A1 | 8/2002 | Yan et al. | |
| 2007/0172940 A9 | 7/2007 | Manalis et al. | |
| 2007/0202538 A1* | 8/2007 | Glezer | G01N 33/54393 435/7.1 |
| 2009/0270274 A1 | 10/2009 | Liu et al. | |
| 2010/0120083 A1* | 5/2010 | Ritzen | B01L 3/502723 204/403.02 |
| 2012/0220494 A1 | 8/2012 | Samuels et al. | |
| 2013/0171679 A1 | 7/2013 | Lee et al. | |
| 2013/0287645 A1 | 10/2013 | Shaikh et al. | |
| 2014/0061524 A1 | 3/2014 | Hong | |
| 2014/0155295 A1 | 6/2014 | Hindson et al. | |
| 2017/0056886 A1* | 3/2017 | Hiddessen | G01N 15/1484 |
| 2018/0327838 A1 | 11/2018 | Giresi et al. | |
| 2019/0177800 A1 | 6/2019 | Boutet et al. | |
| 2019/0276817 A1 | 9/2019 | Hindson et al. | |
| 2019/0382836 A1 | 12/2019 | Hindson et al. | |
| 2020/0063191 A1 | 2/2020 | Bent et al. | |

FOREIGN PATENT DOCUMENTS

| | | | | |
|---|---|---|---|---|
| WO | WO-2009/015296 A1 | 1/2009 | | |
| WO | WO-2012/048341 A1 | 4/2012 | | |
| WO | WO-2014/210353 A2 | 12/2014 | | |
| WO | WO-2015178413 A1 * | 11/2015 | | B01L 3/5085 |
| WO | WO-2017/151828 A1 | 9/2017 | | |

OTHER PUBLICATIONS

International Search Report and Written Opinion for International Patent Application No. PCT/US2018/035774, mailed Aug. 31, 2018 (9 pages).

* cited by examiner

GASKETS FOR THE DISTRIBUTION OF PRESSURES IN A MICROFLUIDIC SYSTEM

CROSS-REFERENCE TO RELATED APPLICATIONS

This application claims the benefit of U.S. Provisional Patent Application No. 62/515,236, filed Jun. 5, 2017, and entitled "Gaskets for the Distribution of Pressures in a Microfluidic System," which is incorporated by reference herein in its entirety.

FIELD OF THE INVENTION

The present invention, according to some embodiments, relates to a gasket for distributing pressures in a microfluidic system. More particularly, in some embodiments the present invention relates to a gasket for distributing pressure from a manifold to a microfluidic chip. In some embodiments, the present invention relates to a microfluidic system including such a gasket.

BACKGROUND OF THE INVENTION

Flow in a microfluidic chip can be driven by a controlled external pressure source. A manifold connected to the external pressure source may be used to distribute the pressure generated by the pressure source to the fluid channels of the microfluidic chip. Typically, a port in the manifold must be aligned with an opening of the fluid channel to allow communication of pressure from the pressure source to the fluid in the fluid channel. The opening may be an inlet or an outlet of the fluid channel. Such an arrangement necessitates a separate port in the manifold for each inlet or outlet of the microfluidic chip.

Changes to the number of inlets or outlets in the microfluidic chip therefore require potentially expensive and time-consuming alterations in the configuration of the manifold and/or pressure source. In some situations, a complete redesign of the manifold and/or pressure source is required in order to accommodate a change in the number of inputs or outputs of the microfluidic chip.

SUMMARY OF THE INVENTION

The present invention provides a solution by which the number of inputs or outputs of a microfluidic chip may be increased without requiring changes to the pressure source or manifold. According to some embodiments, the present invention provides a gasket configured to distribute pressure from a manifold to a microfluidic chip. In some embodiments, the present invention provides a microfluidic system including a gasket for distributing pressure from a manifold to a microfluidic chip. In some embodiments, the gasket has an arrangement which allows a port of the manifold to communicate with two or more fluid channels of the microfluidic chip.

A microfluidic system according to certain embodiments of the present invention includes a microfluidic chip including a plurality of fluid channels, each fluid channel having an opening providing access to an interior of the fluid channel, and a gasket disposable on the microfluidic chip in an aligned configuration. In some embodiments, the gasket includes a first side configured to face the microfluidic chip in the aligned configuration, a second side opposite the first side, and an aperture extending through the gasket from the first side to the second side, the aperture being sized and positioned to allow a communication of pressure from the second side of the gasket to the openings of at least two fluid channels when the gasket is in the aligned configuration. In some such embodiments, the aperture is sized and positioned to overlay a portion of each opening of the at least two fluid channels when the gasket is in the aligned configuration. In some embodiments, the portion of each opening has an area that is less than a total area of the opening. In some embodiments, the aperture of the gasket has an area that is less than a total area of the openings of the at least two fluid channels. In further embodiments, the openings of the at least two fluid channels are separated by a wall, and the aperture is sized and positioned to overlay at least a portion of the wall when the gasket is in the aligned configuration. In some embodiments, the aperture of the gasket includes a circular shape. In other embodiments, the aperture of the gasket includes a non-circular shape. In some embodiments, the aperture of the gasket has, for example, an elongated shape, an oval or elliptical shape, polygonal shape, star shape, or an irregular shape. In some embodiments, the at least two fluid channels includes three or more fluid channels. In some embodiments, the at least two fluid channels includes four or more fluid channels. In some embodiments, the at least two fluid channels includes five or more fluid channels. In some embodiments, the at least two fluid channels includes six or more fluid channels.

In some embodiments, the aperture is one of a first set of apertures extending through the gasket from the first side to the second side, each aperture of the first set of apertures being sized and positioned to overlay the openings of at least two fluid channels when the gasket is in the aligned configuration. In some embodiments, each aperture of the first set of apertures may be similarly sized and shaped. In other embodiments, the first set of apertures includes differently sized or shaped apertures. In some embodiments, the gasket further comprises a second set of apertures, each aperture of the second set of apertures being sized and positioned to overlay only one fluid channel opening when the gasket is in the aligned configuration. In some embodiments, each aperture of the second set of apertures may be similarly sized and shaped. In other embodiments, the second set of apertures includes differently sized or shaped apertures.

In some embodiments, a microfluidic system according to present invention further includes a pressure source and a manifold connected to the pressure source. The manifold, in some embodiments, has a plurality of ports for distributing pressure from the pressure source to the plurality of fluid channels of the microfluidic chip. In further embodiments, the manifold is positionable on the second side of the gasket, the gasket being configured to provide a seal between the manifold and the microfluidic chip. In some embodiments, each port of the manifold is configured to align with a different aperture of the gasket when the manifold is positioned on the second side of the gasket. In some embodiments, the number of ports of the manifold is equal to the number of apertures of the gasket. In some embodiments, the number of ports of the manifold is less than the number of apertures of the gasket. In some embodiments, the number of ports of the manifold is less than the number of fluid channels of the microfluidic chip. In some embodiments, the microfluidic chip includes a base, and each fluid channel comprises a well extending from the base. In some embodiments, the gasket is configured to provide a seal between the manifold and the wells of the microfluidic chip. In other embodiments, the microfluidic chip comprises a base, and the opening of each of the fluid channels is substantially flush with a surface of the base. In some such embodiments, the first side of the gasket is configured to abut the surface of the base when the gasket is in the aligned configuration.

In some embodiments, a microfluidic system includes a chip holder that is sized and shaped to surround at least a portion of the microfluidic chip. In some embodiments, the microfluidic system also includes a tray having an indentation that is sized and configured to receive the chip holder. In further embodiments, the tray is movably mounted onto a platform. In some such embodiments, the platform includes one or more rails, and the tray is configured to slide along the one or more rails. In some embodiments, the gasket includes one or more alignment features which are configured to engage with a portion of the chip holder when the gasket is in the aligned configuration. In some embodiments, for example, the one or more alignment features includes one or more alignment holes or slots which are positioned and configured to receive one or more protrusions or tabs on the chip holder in the aligned configuration.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

DETAILED DESCRIPTION

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art. All publications, patent applications, patents, and other references mentioned herein are incorporated by reference in their entirety.

Figure 1A:
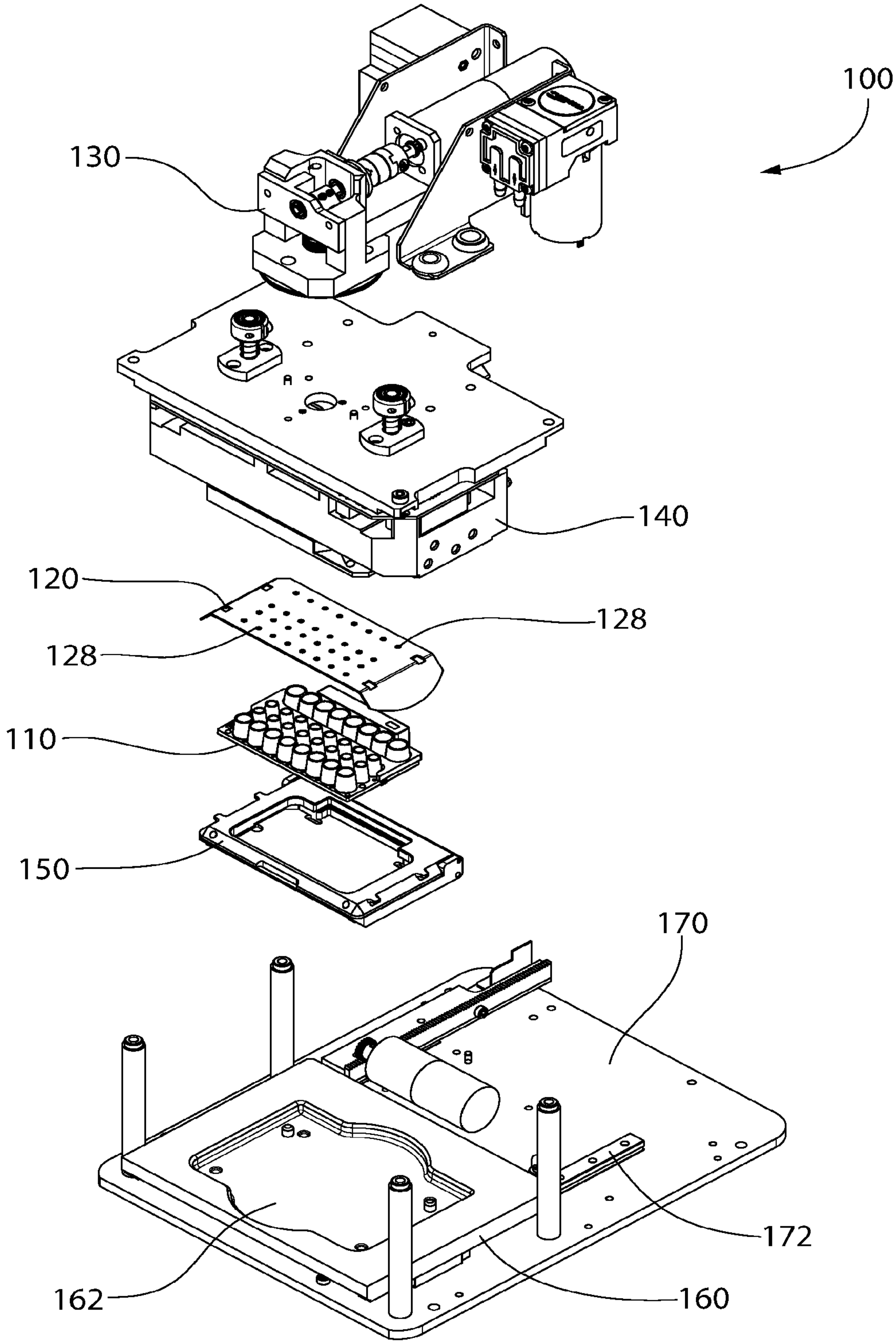
FIG. 1A is an exploded perspective view of a microfluidic system including a gasket, microfluidic chip, manifold, and pressure source according to an embodiment of the present invention.
Figure 1B:
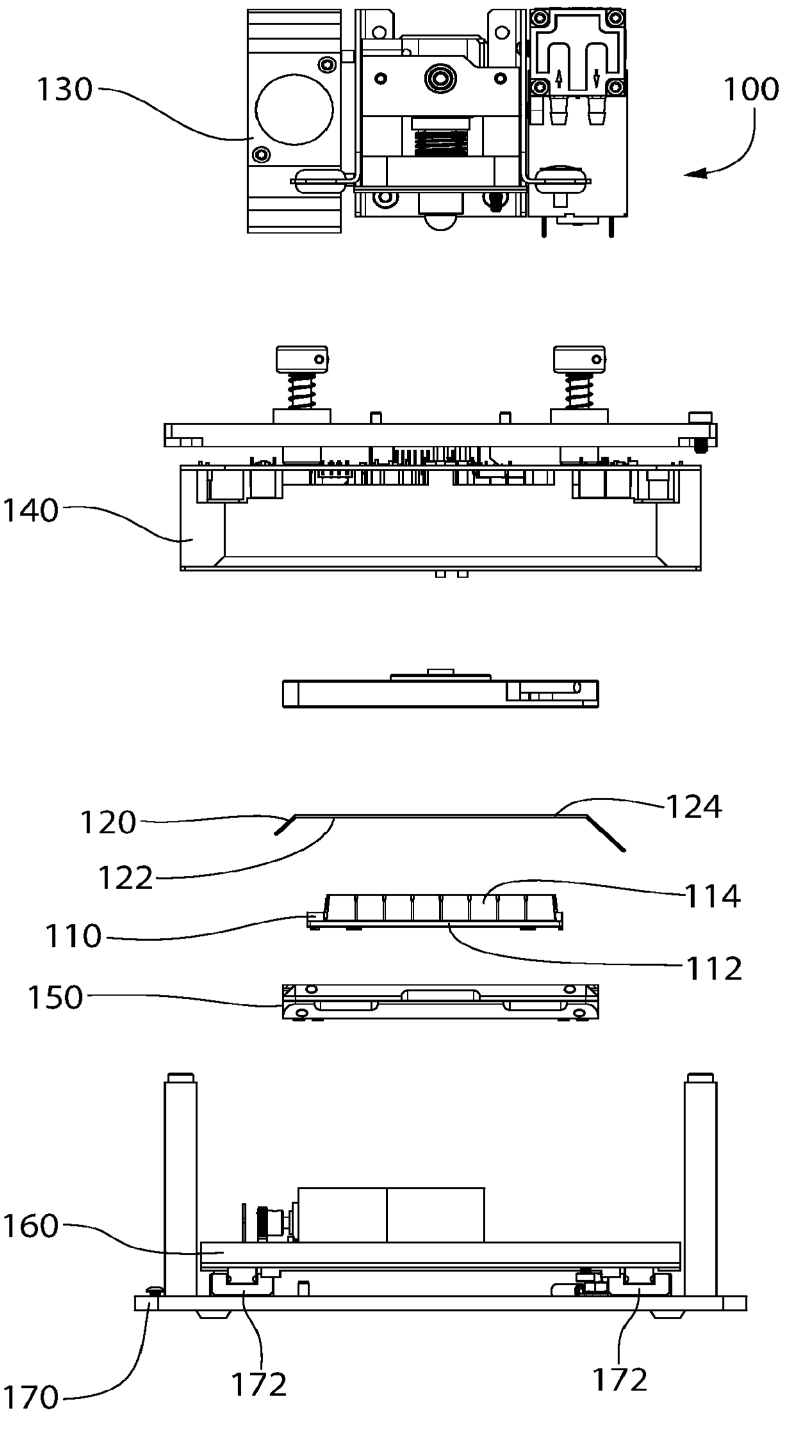
FIG. 1B is an elevational view of the microfluidic system shown in FIG. 1A.

Referring to the drawings in detail, wherein like reference numerals indicate like elements throughout, there is shown in FIGS. 1A and 1B an exploded view of a microfluidic system, generally designated 100, in accordance with an exemplary embodiment of the present invention. In some embodiments, microfluidic system 100 includes or consists of a microfluidic chip 110 and a gasket 120 disposable on microfluidic chip 110. Microfluidic chip 110, in some embodiments, may be configured, for example, for use in continuous-flow microfluidics, genomic analysis, cell or particle sorting, purification, biological/biochemical assaying, lab-on-chip applications, optofluidics, fuel cells, etc. Microfluidic chip 110, in some embodiments, includes a plurality of fluid channels for containing fluid samples, each fluid channel having an opening (e.g., inlet or outlet) providing access to an interior of the fluid channel. The openings of the fluid channels may be positioned at a top of microfluidic chip 110 according to some embodiments. Microfluidic chip 110, in some embodiments, is configured for use with fluid samples of microliter, nanoliter, or picoliter volume sizes or less, for example, less than 10 microliters, less than 5 microliters, less than 1 microliter, less than 500 nanoliters, less than 100 nanoliters, less than 50 nanoliters, less than 10 nanoliters, or less than 1 nanoliter. In some embodiments, the fluid sample may contain, for example, a biological or biochemical material (e.g., cells, proteins genetic material, viral particles, etc.), non-biological material, solid material (e.g., suspended beads, particles, or colloids), or gases or vapors. An example composition that may be used with microfluidic chip 110 according to certain embodiments is described in International Publication No. WO 2016/187256 A2, which is incorporated by reference herein in its entirety.

Gasket 120, in some embodiments, includes a first side 122 configured to face and abut microfluidic chip 110 and a second side 124 opposite the first side. Gasket 120 in some embodiments may be constructed from a thin sheet of material, for example, silicone (e.g., 50 durometer, Shore A silicone), rubber, or other similar elastomer. In some embodiments, gasket 120 has a thickness of less than 1 mm. In some embodiments, gasket 120 has a thickness of about 0.50 mm to about 1.0 mm, about 0.60 mm to about 0.90 mm, or about 0.70 mm to about 0.80 mm. In some embodiments, gasket 120 has a thickness of or about 0.79 mm. The thickness of gasket 120 may be considered the dimension from the first side of gasket 120 to the second side of gasket 120. As will be described in further detail herein, in some embodiments gasket 120 includes one or more apertures 128 extending from the first side to the second side which are each particularly sized and positioned to overlay the openings of at least two fluid channels of microfluidic chip 110 when gasket 120 is in an aligned configuration with respect to microfluidic chip 110. Gasket 120, in some embodiments, may include one or more additional apertures which are each sized and positioned to overlay only one fluid channel opening when gasket 120 is in the aligned configuration.

As further illustrated in FIGS. 1A and 1B, in some embodiments, microfluidic system 100 further includes a pressure source 130, for example, a pneumatic or hydraulic pump, and a manifold 140 that is configured to communicate pressure from pressure source 130 to microfluidic chip 110. Pressure source 130 and/or manifold 140 may be configured and controlled to deliver pressure to the fluid channels of microfluidic chip 110 in order to drive flow of the fluid contained therein. Manifold 140, in some embodiments, may be in fluid communication with pressure source 130 via pipes or tubing (not shown). In further embodiments, manifold 140 includes one or more ports for directing the pressure towards the fluid channels of microfluidic chip 110. In some embodiments, gasket 120 is positioned between microfluidic chip 110 and manifold 140. In some embodiments, manifold 140 is positionable on or against the second side of gasket 120 such that gasket 120 may be sandwiched directly between manifold 140 and microfluidic chip 110. In some embodiments, gasket 120 is configured to provide a seal between manifold 140 and microfluidic chip 110. The one or more apertures of gasket 120 according to some embodiments are configured to align with the one or more ports of manifold 140. In some embodiments, manifold 140 and/or pressure source 130 may be movable relative to microfluidic chip 110 and gasket 120 such that manifold 140 and/or pressure source 130 can be aligned with gasket 120. For example, manifold 140 and/or pressure source 130 may be moved by one or more actuators which can be operated by a control system (not shown).

Figure 2A:
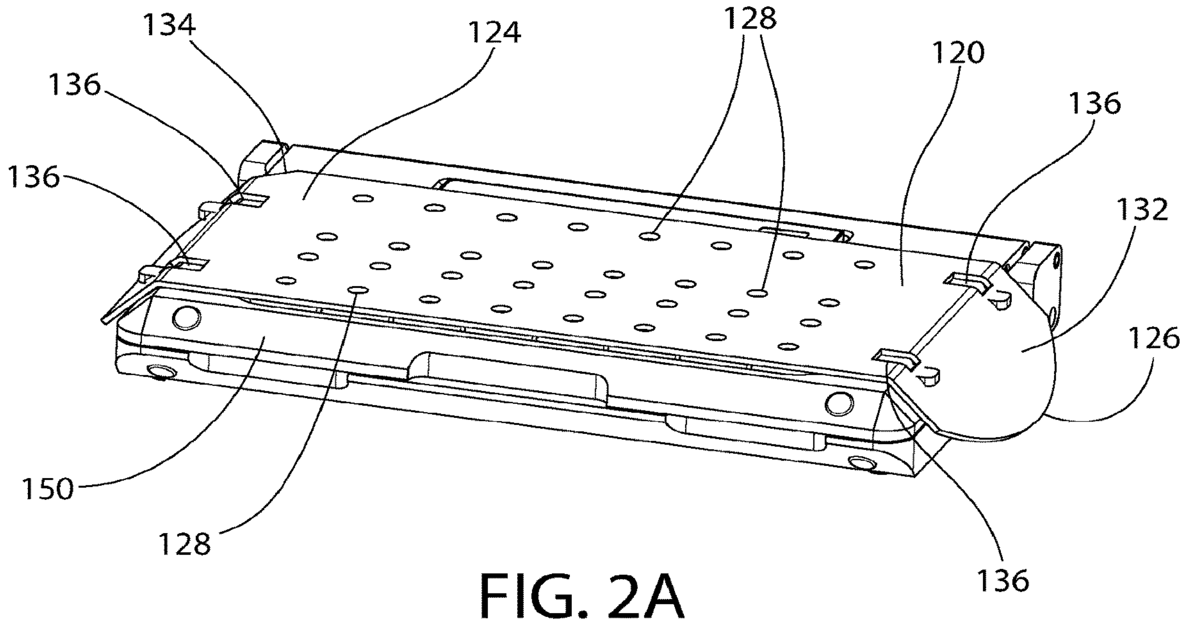
FIG. 2A is a perspective view of a gasket coupled to a microfluidic chip positioned in a chip holder according to an embodiment of the present invention.
Figure 2B:
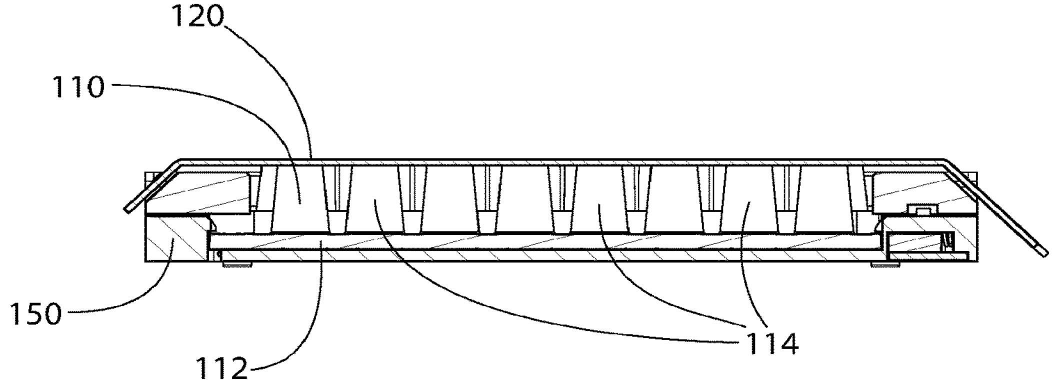
FIG. 2B is a cut-away elevational view of the gasket, microfluidic chip, and chip holder shown in FIG. 2A.
Figure 3:
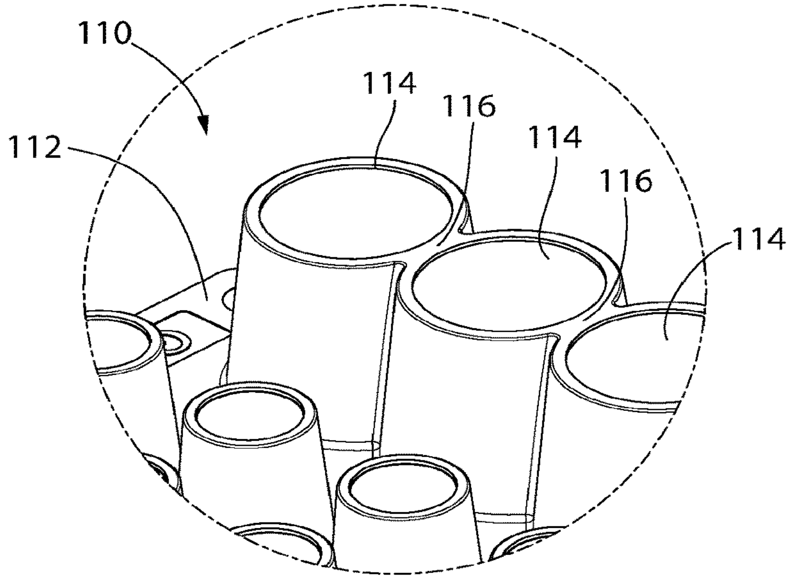
FIG. 3 is a partial perspective view of the wells of a microfluidic chip according to an embodiment of the present invention.

In yet further embodiments, microfluidic system 100 may additionally include a chip holder 150 which is configured to receive and hold microfluidic chip 110. With additional reference to FIGS. 2A and 2B, in some such embodiments, chip holder 150 is sized and shaped to surround at least a portion of microfluidic chip 110. In some embodiments, chip holder 150 abuts against and surrounds base 112 of microfluidic chip 110. As particularly shown in FIGS. 1B and 2B, microfluidic chip 110, in some embodiments, includes one or more wells 114 extending from the base 112 which provide the openings (e.g., inlets or outlets) for the fluid channels of microfluidic chip 110. In some embodiments, chip holder 150 is further configured to surround at least a portion of the one or more wells 114. In some embodiments, an open end (e.g., top) of each well 114 extends above chip holder 150 when microfluidic chip 110 is received within chip holder 150. In some embodiments, rather than wells which extend from base 112, the wells may be formed within base 112. In some such embodiments, the opening of each of the fluid channels may be substantially flush with a surface (e.g., top surface) of the base 112. In some embodiments, one or more wells 114 may be separated and spaced from each of the other wells 114. In some embodiments, for example as shown in FIG. 3, two or more wells 114 may be joined by a common wall 116.

Referring again to FIGS. 1A and 1B, in some embodiments chip holder 150 may be positioned on tray 160 which includes an indentation 162 (see FIG. 1A) that is sized and configured to receive chip holder 150. In some embodiments, tray 160 may be used to position chip holder 150 and microfluidic chip 110 held in chip holder 150 with respect to manifold 140 and/or pressure source 130. In some such embodiments, tray 160 may be movably mounted onto a platform 170. In some embodiments, tray 160 may be configured to slide along one or more rails 172 provided on platform 170. Movement of tray 160 on rails 172, in some embodiments, may be caused by one or more actuators which can be operated by a control system (not shown).

Figure 4:
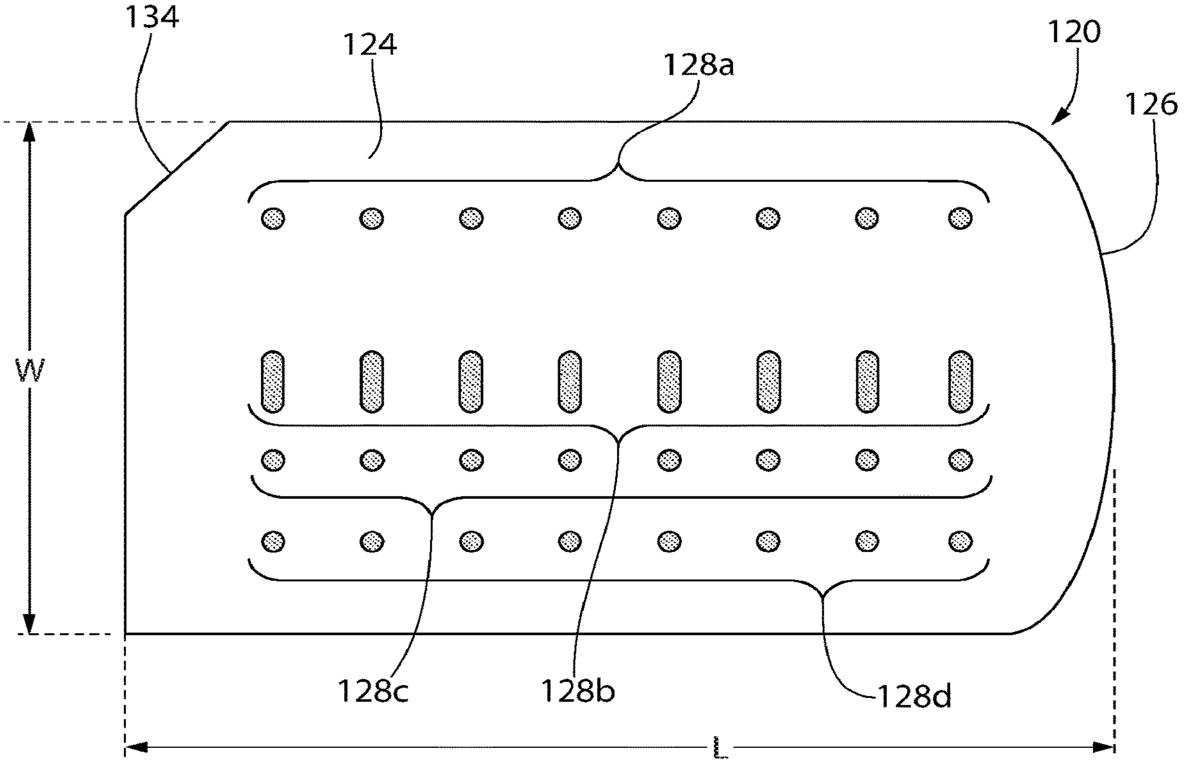
FIG. 4 is a top plan view of a gasket having a plurality of apertures according to an embodiment of the present invention.

Referring now to FIG. 4, there is shown a top plan view of a gasket 120 according to an embodiment of the present invention in which the second side 124 of gasket 120 is visible. In some embodiments, gasket 120 may have a length L and a width W of sufficient dimension to cover microfluidic chip 110. Length L represents the broadest dimension of gasket 120 in first direction and width W represents the broadest dimension of gasket 120 in a second direction which is perpendicular to the first direction. In some embodiments, gasket 120 has a length L and a width W that are at least the same as or greater than a length and width of base 112 of microfluidic chip 110. In some embodiments, gasket 120 has a width W that is substantially the same as a width of base 112 and a length L that is greater than a length of base 112. In some embodiments, for example, gasket 120 may have a length L of about 100 mm to about 140 mm, about 110 mm to about 130 mm, about 115 mm to about 125 mm, or about 117 mm to about 119 mm. In some particular embodiments, length L is or is about 118.2 mm. In some embodiments, width W is shorter than length L of gasket 120 and may be, for example, about 30 mm to about 60 mm, 35 mm to about 55 mm, about 40 mm to about 50 mm. In some embodiments, width W is or is about 45 mm. In some embodiments, a ratio of length L to width W is at least 2:1. It should be appreciated that shorter or longer values of length L and width W may be used in other embodiments to accommodate for smaller or larger microfluidic chips.

In some embodiments, gasket 120 may have generally rectangular or other polygonal shape. In some embodiments, gasket 120 may have one or more curved edges 126. In some embodiments, curved edge 126 may be positioned at a first end of gasket 120. In some embodiments, curved edge 126 may be a convexly curved edge having a radius of curvature of about 30 mm to about 40 mm, for example, 35 mm. In some embodiments, gasket 120 includes a flap 132 which provides an area for a user to hold gasket 120 which, for example, aids in the placement of gasket 120 over microfluidic chip 110. In some embodiments, flap 132 is at or proximate a first end of gasket 120 and includes the curved edge 126. In some embodiments, the flap 132 does not overlay the one or more wells 114 of microfluidic chip 110 when gasket 120 is in the aligned configuration with respect to microfluidic chip 110. Rather, in some embodiments, the flap 132 may be configured to overlay or overhang a portion of chip holder 150 when gasket 120 is in the aligned configuration. In some embodiments, curved edge 126 extends beyond chip holder 150 when gasket 120 is in the aligned configuration.

In some embodiments, gasket 120 includes one or more alignment features to aid in the positioning of gasket 120 in the aligned configuration with respect to microfluidic chip 110. The one or more alignment features of gasket 120 may include, for example, one or more features that are configured to couple with corresponding features on microfluidic chip 110 and/or chip holder 150 when gasket 120 is in the aligned configuration. In some embodiments, the one or more alignment features may also provide a visual indicator to help the user to correctly orient gasket 120 over microfluidic chip 110 to obtain the aligned configuration. In some embodiments, gasket 120 may have asymmetrically arranged features which are configured to help a user to determine the orientation of gasket 120. In some embodiments, gasket 120 includes corners or edges which are asymmetrically configured. In some embodiments, for example as shown in FIGS. 2A and 4, gasket 120 includes one or more truncated corners 134. In some embodiments, gasket 120 includes a single truncated corner 134, which may be located at a second end of gasket 120 that is opposite of curved edge 126 in some examples. In some embodiments, the truncated corner 134 and/or curved edge 126 may help a user to easily distinguish between the ends of gasket 120 and aid in the placement of gasket 120 in the proper orientation over microfluidic chip 110. For example, in some embodiments, curved edge 126 may be oriented towards the right while truncated corner 134 is oriented towards the left when gasket 120 is in the aligned configuration. In should be understood that the relative locations of curved edge 126 and truncated 134 could be reversed in other embodiments. As shown for example in FIG. 2A, gasket 120 may be sized such that the first and/or second ends of gasket 120 extend over sides of chip holder 150 when gasket 120 is in the aligned configuration according to some embodiments.

As further shown in FIG. 2A, in some embodiments, gasket 120 may include one or more alignment holes or slots 136. In some embodiments, the one or more alignment holes or slots 136 are positioned and configured to engage with a portion of chip holder 150 and/or microfluidic chip 110 in the aligned configuration. In some embodiments, chip holder 150 and/or microfluidic chip 110 includes one or more protrusions or tabs which are received by and sized to fit into the one or more alignment holes or slots 136 when gasket 120 is in the aligned configuration. In some embodiments, gasket 120 includes two alignment holes or slots 136 at or proximate a first end, and two alignment holes or slots 136 at or proximate a second end. The one or more alignment holes or slots 136 may be asymmetrically arranged on gasket 120 according to some embodiments. In some embodiments, the one or more alignment holes or slots 136 may be, for example, generally rectangular in shape. In some embodiments, the one or more alignment holes or slots 136 are larger than the one or more apertures 128. Unlike the one or more apertures 128, in some embodiments the one or more alignment holes or slots 136 are not positioned to overlay any of the fluid channel openings of microfluidic chip 110 when gasket 120 is in the aligned configuration. Rather, in some embodiments, the one or more alignment holes or slots 136 may be positioned and configured to extend beyond the edges of microfluidic chip 110 and be able to overlay a portion of chip holder 150 in the aligned configuration. In some embodiments, to place gasket 120 in the aligned configuration, a first end of gasket 120 is gripped by a user (e.g., at or proximate to flap 132 and/or curved edge 126) and one or more alignment holes or slots 136 at or proximate to a second end of gasket 120 are engaged with one or more protrusions or tabs extending from a first portion (e.g., left side) of the chip holder 150. Gasket 120 may then be pulled across microfluidic chip 110 and chip holder 150, and one or more alignment holes or slots 136 at or proximate to the first end of gasket 120 are engaged with one or more protrusions or tabs extending from a second portion (e.g., right side) of the chip holder 150.

As previously discussed, in some embodiments gasket 120 includes one or more apertures 128 which extend through gasket 120 which are each configured to overlay one or more fluid channel openings of microfluidic chip 110 in the aligned configuration. In some embodiments, the one or more apertures are configured to align with a port of manifold 140 and provide a passageway through gasket 120 for the communication of pressure between manifold 140 and microfluidic chip 110. In some embodiments, each port of manifold 140 is spaced and positioned to align with one of the one or more apertures of gasket 120. In some embodiments, the one or more apertures of gasket 120 include an aperture which is sized and positioned to allow a communication of pressure (e.g., from manifold 140) to the openings of at least two fluid channels of the microfluidic chip. In some such embodiments, gasket 120 includes an aperture which is sized and positioned to overlay a portion of each opening of at least two fluid channels when gasket 120 is in an aligned configuration with respect to microfluidic chip 110. Thus, in some embodiments, a single port of manifold 140 may be able to communicate pressure to two or more fluid channels. In some embodiments, each aperture has a broadest dimension that is less than 10 mm, less than 7.5 mm, or less than 5 mm. In some embodiments, the apertures may be circular in shape and have a diameter of about 1 mm to about 4 mm, 1.5 mm to about 3.5 mm, or about 2 mm to about 3 mm, for example. In some embodiments, the apertures may have a diameter that is or is about 2.38 mm in diameter.

As shown in the illustrated embodiment of FIG. 4, gasket 120 in some embodiments includes an array of apertures 128. The array of apertures may include, for example, a first set or row of apertures **128*a*, a second set or row of apertures 128*b*, a third set or row of apertures 128*c*, and a fourth set or row of apertures 128*d*. For example, the first set or row of apertures 128*a* may be utilized as outlets of the fluid channels while second, third, and/or fourth sets or rows of apertures 128*b*, 128*c*, and 128*d* may be utilized as inlets of the fluid channels, according to some embodiments. Other embodiments of gasket 120 may include fewer or more sets or rows of apertures. The apertures in each set or row may be similarly sized and shaped as illustrated, or they may be differently sized and shaped in other embodiments. Moreover, while each row shown in the embodiment of FIG. 4 includes eight apertures, it should be understood that the number of apertures in each row could be varied according to other embodiments. In some embodiments, the number of the apertures in the array may be selected to be equal to the number of ports in manifold 140. In some embodiments, the number of the apertures may equal the number of fluid channel openings (e.g., the number of wells 114) in microfluidic chip 110. According to some such embodiments, the apertures of gasket 120 may each be positioned to align with a separate fluid channel opening (e.g., opening of well 114) of microfluidic chip 110 when gasket 120 is in an aligned configuration with respect to microfluidic chip 110**.

In further embodiments, microfluidic chip 110 may include a greater number of fluid channel openings (e.g., the number of wells 114) than the number of apertures in gasket 120. In some embodiments, one or more of the apertures of gasket 120 are particularly sized and positioned to each communicate with two or more fluid channel openings. In the illustrated embodiment, for example, apertures **128*b* may be elongate and sized to overlay a portion of the openings of each of at least two fluid channels. Thus, each of apertures 128*b* may be configured to provide communication with two or more openings (e.g., wells 114) of microfluidic chip 110, and therefore the number of openings in microfluidic chip 110 may be increased without increasing the number of apertures in gasket 120 or increasing the number of ports in manifold 140**.

Figure 5:
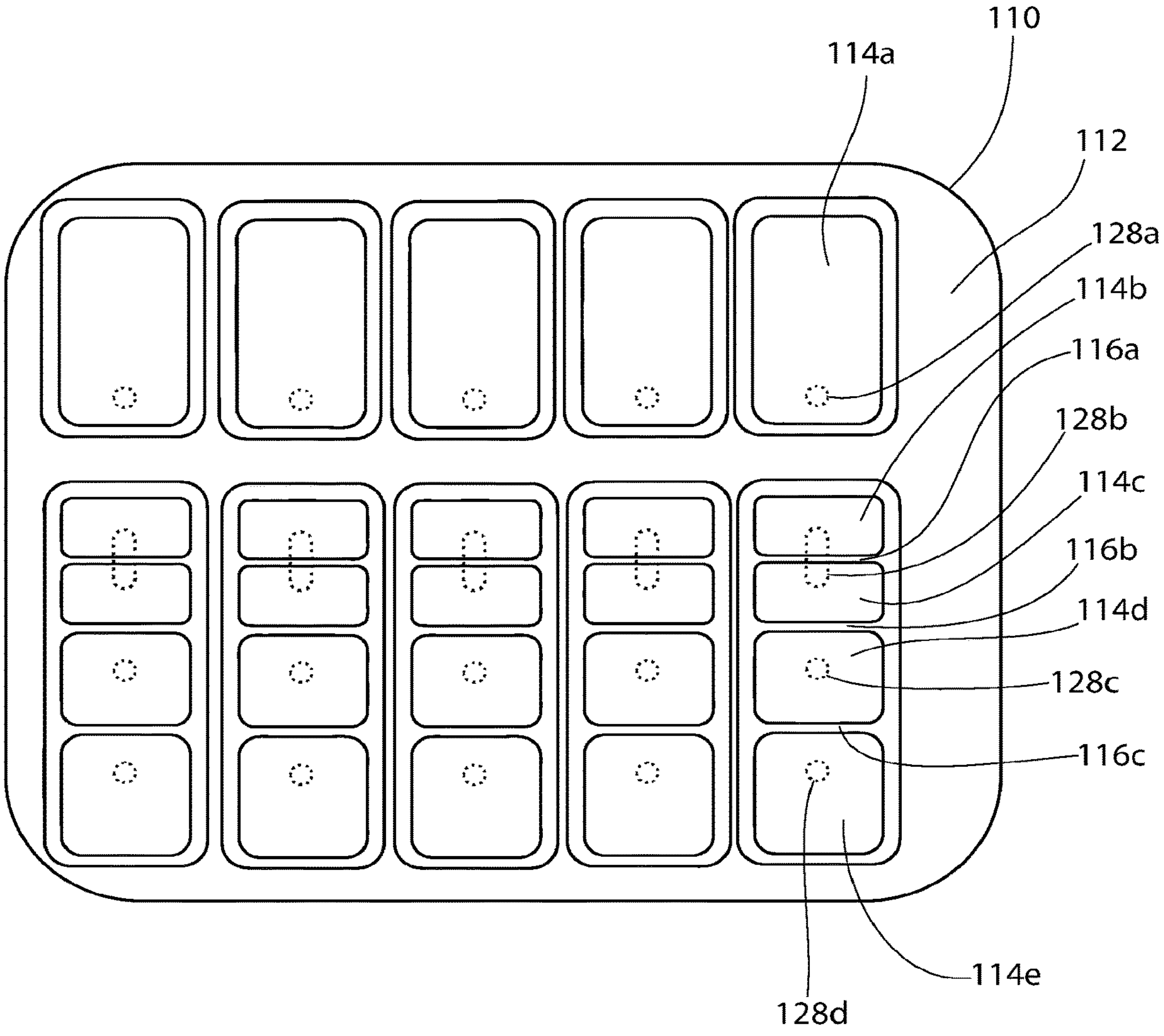
FIG. 5 is a partial top plan view showing the relative positions of the gasket apertures over openings of a microfluidic chip according to an embodiment of the present invention.

FIG. 5 illustrates a partial plan view of a microfluidic chip 110 having rows of fluid channel openings or wells **114*a*, 114*b*, 114*c*, 114*d*, and 114*e* on base 112 in accordance with some embodiments. The relative positions of apertures 128*a*, 128*b*, 128*c*, 128*d* when gasket 120 is disposed over microfluidic ship 110 in an aligned configuration are further shown by the broken lines. For clarity the rest of gasket 120 is not shown. In the illustrated embodiment, wells 114*a* of the first row are separated and spaced from wells 114*b*, 114*c*, 114*d*, and 114*e* of the remaining rows. Meanwhile, as in the embodiment of FIG. 3, each well 114*b* of the second row may be joined to a well 114***c* of the third row and share a common wall 116*a*. Similarly, each well 114*c* of the third row may be further joined to a well 114*d* of the fourth row and share a common wall 116*b*, and each well 114*d* of the fourth row may be further joined to a well 114*e* of the fifth row and share a common wall 116*c*. The wells of one row may have different sizes and/or shapes than the wells of a different row, or they may have the same size and/or shape.

In some embodiments, each aperture 128*a* is sized and positioned to overlay only the opening of one well 114*a* of the first row, each aperture 128*c* is sized and positioned to overlay only the opening of one well 114*d* of the fourth row, and each aperture 128*d* is sized and positioned to overlay only the opening of one well 114*e* of the fifth row. In contrast, according to some embodiments, each aperture 128*b* is sized and positioned to overlay the openings of one well 114*b* of the second row and one well 114*c* of the third row. In some such embodiments, each aperture 128*b* is further sized and positioned to overlay a portion of wall 116*a* which is shared by the wells 114*b* and 114*c*. Pressure communicated through aperture 128*b* (e.g., via a port of manifold 140) can thus be communicated into both wells 114*b* and 114*c*. In should be appreciated that gasket 120 may include more than one row or set of apertures which are sized and positioned to overlay the openings of two or more different wells 114 according to other embodiments. For example, in some embodiments, each aperture of gasket 120 may be configured to overlay at least two different wells 114.

Figure 6A:
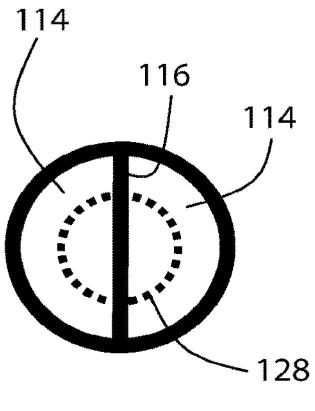
FIGS. 6A-6E show a gasket aperture positioned over different arrangements of microfluidic chip openings according to some embodiments of the present invention.
Figure 6B:
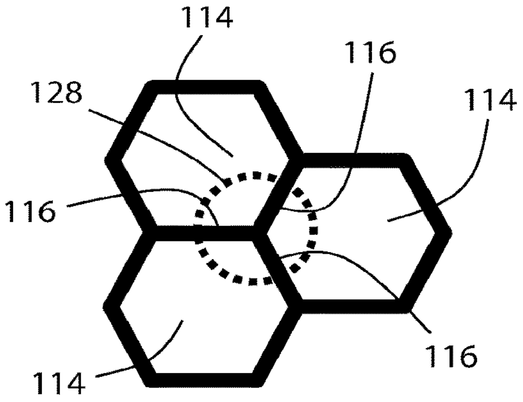
Figure 6C:
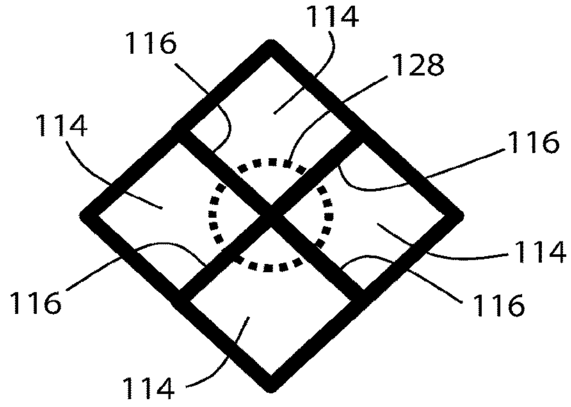
Figure 6D:
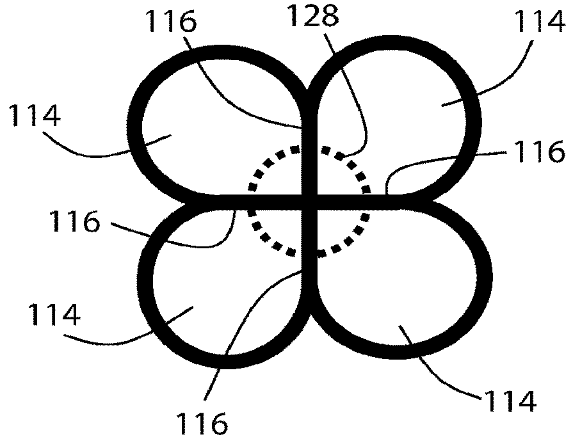
Figure 6E:
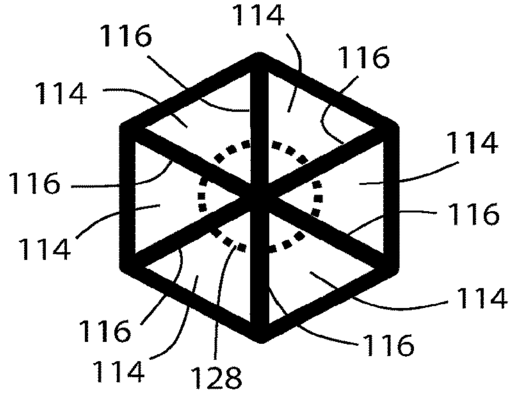

It should also be appreciated that microfluidic chip 110 may have other well arrangements, and that wells 114 need not be arranged in linear rows or sets. FIGS. 6A-6E illustrate non-limiting example arrangements of conjoined wells 114 separated by one or more walls 116 that may be utilized on microfluidic chip 110 according to some embodiments, as well as the positioning of a gasket aperture 128 (broken line) to overlay and communicate with the multiple wells 114. FIG. 6A shows an embodiment where two conjoined wells 114 each have semicircular openings. FIG. 6B shows an embodiment where three conjoined wells 114 each have a hexagonal opening. FIG. 6C shows an embodiment where four conjoined wells 114 each have a square or rectangular opening. FIG. 6D shows an embodiment where four conjoined wells 114 are shaped and arranged to form a quatrefoil shape. FIG. 6E shows an embodiment where six conjoined wells 114 each have a triangular opening. In each of these illustrated examples, gasket aperture 128 may be positioned with respect to the conjoined wells 114 such that gasket aperture 128 overlays a portion of the openings of each of the conjoined wells 114. In further embodiments, gasket aperture 128 is positioned to overlay a portion of the one or more walls 116 which are shared by the conjoined wells 114. In some embodiments, gasket aperture 128 may be, but not necessarily, positioned centrally with respect to the conjoined wells 114. The portion of each opening overlaid by gasket aperture 128 is less than the total area of the opening according to some embodiments. In some embodiments, the gasket aperture 128 has an area that is less than the total area of the openings of the conjoined wells 114. While in each embodiment illustrated in FIGS. 6A-6E the wells 114 have the same size and shape, this need not always be the case. In other embodiments, conjoined wells 114 may each have openings with different sizes and/or shapes. Furthermore, while gasket aperture 128 is depicted as generally being circular in FIGS. 6A-6E, other shapes may also be utilized.

Figure 7A:
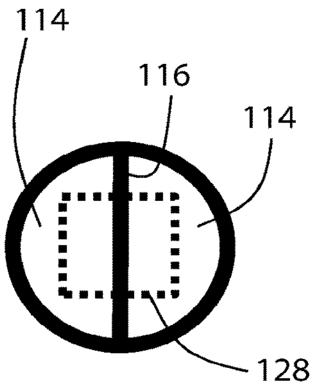
FIGS. 7A-7E show different gasket aperture shapes positioned over different arrangements of microfluidic chip openings according to some embodiments of the present invention.
Figure 7B:
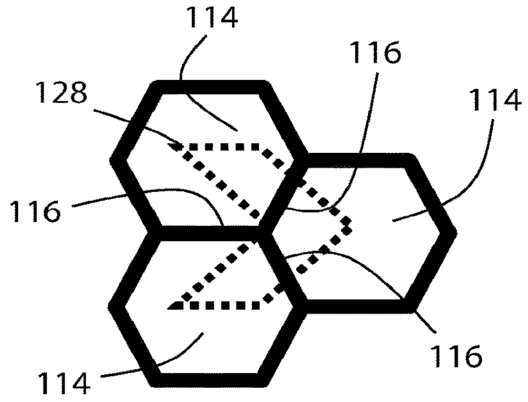
Figure 7C:
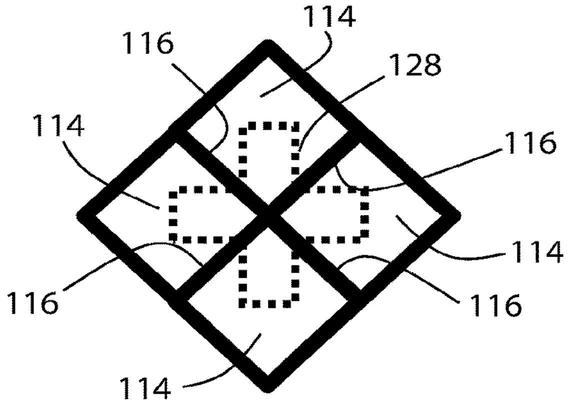
Figure 7D:
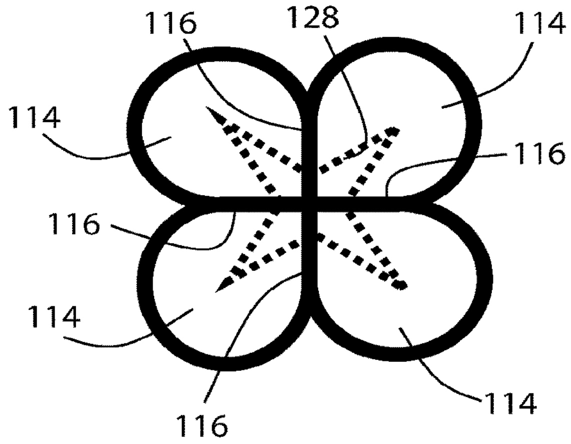
Figure 7E:
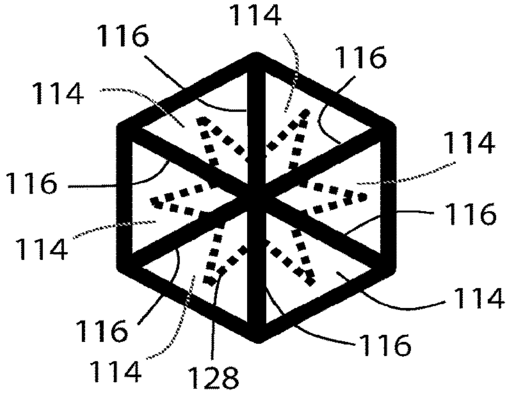

In some embodiments, gasket aperture 128 may have a non-circular shape, for example, an elongated shape, oval or racetrack, square or rectangular, cross, star, chevron, I-shape, L-shape, T-shape, U-shape, V-shape, etc. Gasket aperture 128 may be symmetrically shaped in some embodiments (e.g., bilaterally symmetric, radially symmetric), or may be asymmetrically shaped in other embodiments. In some embodiments, gasket aperture 128 may have a polygonal shape, a curved shape, or an irregular shape. FIGS. 7A-7E illustrate non-limiting examples of different shapes of gasket aperture 128 positioned over the various arrangements of conjoined wells 114 shown in FIGS. 6A-6E. FIG. 7A shows an embodiment where gasket aperture 128 has a square or rectangular shape. FIG. 7B shows an embodiment where gasket aperture 128 has a chevron or V-shape. FIG. 7C shows an embodiment where gasket aperture 128 has a cross shape. FIG. 7D shows an embodiment where gasket aperture 128 has a shape of a four-pointed star. FIG. 7E shows an embodiment where gasket aperture 128 has a shape of a six-pointed star.

Figure 8A:
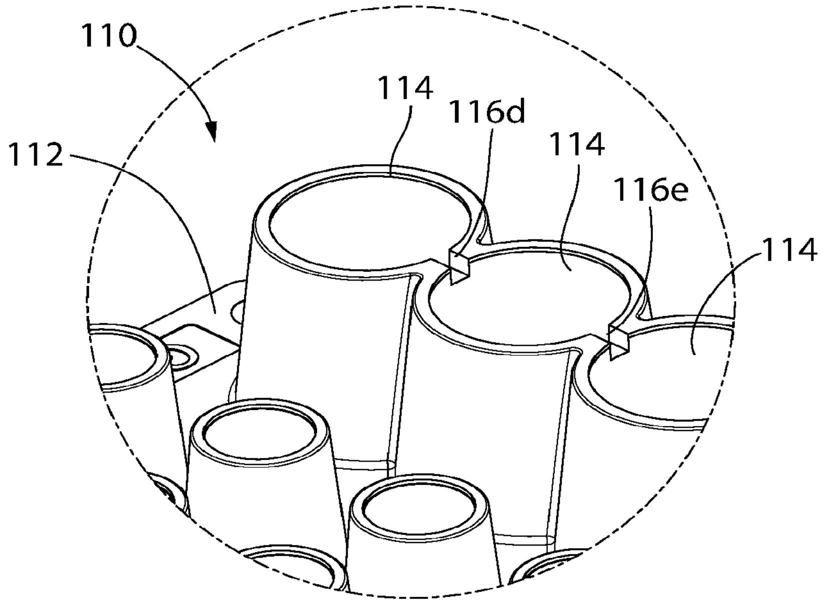
FIG. 8A is a partial perspective view of the wells of a microfluidic chip according to an embodiment of the present invention.

Referring to FIG. 8A, one or more of the common walls 116 between two adjacent wells 114 may include one or more notches 116*d*, 116*e*. In one embodiment, the notches 116*d*, 116*e* are generally rectangular in cross sectional shape and are at least partially open toward the top of the wall 116. In other embodiments, the notches 116*d*, 116*e* are semicircular or triangular in cross section and open at least partially toward the top of the wall 116. The notches 116*d*, 116*e* may fluidly couple adjacent wells 114. In some embodiments, for example, notches 116*d*, 116*e* form a channel through a common wall 116 that connects two adjacent wells 114.

Figure 8B:
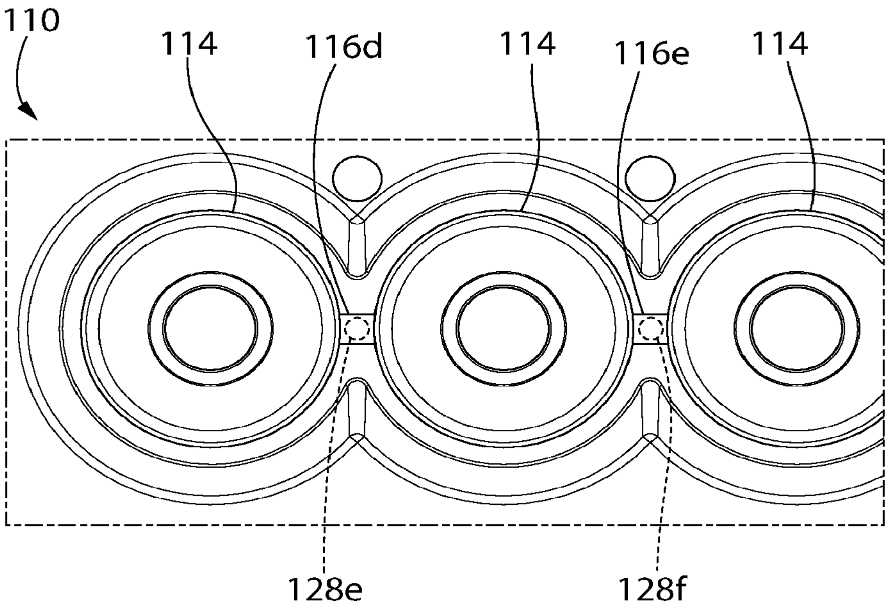
FIG. 8B is a partial top plan view of FIG. 8A showing the relative position of the gasket apertures over notches fluidly extending between the wells of the microfluidic chip.

Referring to FIG. 8B, one or more of the apertures 128*e*, 128*f* may be configured to align with a respective notch 116*d*, 116*e* such that a single aperture (e.g., 128*e* or 128*f*) may be fluidly coupled with at least two adjacent wells 114.

While the embodiments described herein are illustrative of gaskets which may be useful for distributing pressure from a manifold to a microfluidic chip to drive flow in the microfluidic chip, the gaskets described herein are not necessarily limited to this use. In some embodiments, the gaskets described herein may also be used for distributing the fluid samples or other liquids into the fluid channels of the microfluidic chip. For example, liquid may be distributed to the fluid channels of the microfluidic chip through the apertures of the gasket. The liquid may be supplied, for example, by a separate manifold connected to a liquid source or reservoir.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps that perform substantially the same function or achieve substantially the same result as the corresponding embodiments described herein may be utilized according to the present invention.

What is claimed is:

1. A kit comprising:

a microfluidic chip comprising:

(i) a plurality of fluid channels, each of the plurality of fluid channels having an opening in a surface of the microfluidic chip and providing access to an interior of the fluid channel, and (ii) a plurality of wells, each well comprising a base and extending from the base to a rim of the well defining one of the openings, wherein the openings of at least two fluid channels of two adjacent wells are separated by a common wall where the rims of the two adjacent wells are coextensive; and a gasket comprising a first side configured to face the surface of the microfluidic chip in an aligned configuration, a second side opposite the first side, and an aperture extending through the gasket from the first side to the second side, the aperture being sized and positioned to allow a communication of pressure from the second side of the gasket to the openings of the at least two fluid channels when the gasket is in the aligned configuration, wherein the aperture is sized and positioned to overlay at least a portion of the openings of the at least two fluid channels and a portion of the rims of the two adjacent wells when the gasket is in the aligned configuration; and wherein the at least two fluid channels are coupled to one another through a notch, the aperture being sized and positioned to overlay a portion of the notch when the gasket is in the aligned configuration.

2. The kit of claim 1, wherein:

(a) the openings of the at least two fluid channels are each non-circular in shape;

(b) the portion of each opening has an area that is less than a total area of the opening; or (c) the aperture has an area that is less than a total area of the openings of the at least two fluid channels.

3. The kit of claim 1, wherein the aperture allows communication of pressure to openings in the surface of the microfluidic chip of at least three fluid channels.

4. The kit of claim 1, wherein the aperture has a non-circular shape.

5. The kit of claim 1, wherein the openings of the at least two fluid channels are each semicircular, triangular, hexagonal, square, or rectangular in shape.

6. The kit of claim 1, wherein the openings of the at least two fluid channels are each circular in shape.

7. The kit of claim 1, wherein the aperture is one of a first set of apertures extending through the gasket from the first side to the second side, each aperture of the first set of apertures being sized and positioned to overlay the openings of at least two fluid channels when the gasket is in the aligned configuration.

8. The kit of claim 7, wherein the gasket further comprises a second set of apertures, wherein each aperture of the second set of apertures is sized and positioned to overlay only one fluid channel opening when the gasket is in the aligned configuration.

9. The kit of claim 1, wherein the gasket comprises silicone or rubber.

10. The kit of claim 1, wherein the microfluidic chip comprises a base.

11. The kit of claim 1, wherein the gasket comprises:

(a) a thickness of about 0.50 mm to about 1.0 mm;

(b) a length of about 100 mm to about 140 mm; and/or (c) a width of about 30 mm to about 60 mm.

12. A method of applying pressure comprising:

(a) providing the kit of claim 1, wherein the gasket is aligned on the microfluidic chip, and wherein a manifold comprising a plurality of ports is operably connected to a pressure source and the gasket; and (b) applying pressure to the plurality of fluid channels in the microfluidic chip from the pressure source via the manifold.

13. A kit comprising:

a microfluidic chip comprising:

(i) a plurality of fluid channels, each of the plurality of fluid channels having an opening in a surface of the microfluidic chip and providing access to an interior of the fluid channel, and (ii) a plurality of wells, each well comprising a base and extending from the base to a rim of the well defining one of the openings, wherein the openings of at least two fluid channels of two adjacent wells are separated by a common wall where the rims of the two adjacent wells are coextensive;

a gasket comprising a first side configured to face the surface of the microfluidic chip in an aligned configuration, a second side opposite the first side, and an aperture extending through the gasket from the first side to the second side, the aperture being sized and positioned to allow a communication of pressure from the second side of the gasket to the openings of the at least two fluid channels when the gasket is in the aligned configuration, wherein the aperture is sized and positioned to overlay at least a portion of the openings of the at least two fluid channels and a portion of the rims of the two adjacent wells when the gasket is in the aligned configuration; and a chip holder that is sized and shaped to surround at least a portion of the microfluidic chip;

wherein the gasket comprises one or more alignment features, which are configured to engage with a portion of the chip holder in the aligned configuration, wherein the one or more alignment features includes one or more alignment holes or slots, wherein the chip holder includes one or more protrusions or tabs, and wherein the one or more protrusions or tabs are positioned and configured to be received within the one or more alignment holes or slots in the aligned configuration.

14. The kit of claim 13, further comprising a tray having an indentation that is sized and configured to receive the chip holder.

15. The kit of claim 14, wherein the tray is configured to be mounted onto a platform.

16. The kit of claim 13, wherein the aperture is centrally positioned with respect to the openings of the at least two fluid channels when the gasket is in the aligned configuration.

17. The kit of claim 13, wherein:

(a) the openings of the at least two fluid channels are each non-circular in shape;

(b) the portion of each opening has an area that is less than a total area of the opening; or (c) the aperture has an area that is less than a total area of the openings of the at least two fluid channels.

18. The kit of claim 13, wherein the aperture allows communication of pressure to openings in the surface of the microfluidic chip of at least three fluid channels.

19. The kit of claim 13, wherein the aperture has a non-circular shape.

20. The kit of claim 13, wherein the openings of the at least two fluid channels are each semicircular, triangular, hexagonal, square, or rectangular in shape.

21. The kit of claim 13, wherein the openings of the at least two fluid channels are each circular in shape.

22. The kit of claim 13, wherein the aperture is one of a first set of apertures extending through the gasket from the first side to the second side, each aperture of the first set of apertures being sized and positioned to overlay the openings of at least two fluid channels when the gasket is in the aligned configuration.

23. The kit of claim 22, wherein the gasket further comprises a second set of apertures, wherein each aperture of the second set of apertures is sized and positioned to overlay only one fluid channel opening when the gasket is in the aligned configuration.

24. The kit of claim 13, wherein the gasket comprises silicone or rubber.

25. The kit of claim 13, wherein the microfluidic chip comprises a base.

26. The kit of claim 13, wherein the gasket comprises:

(a) a thickness of about 0.50 mm to about 1.0 mm;

(b) a length of about 100 mm to about 140 mm; and/or (c) a width of about 30 mm to about 60 mm.

27. A method of applying pressure comprising:

(a) providing the kit of claim 13, wherein the gasket is aligned on the microfluidic chip, and wherein a manifold comprising a plurality of ports is operably connected to a pressure source and the gasket; and (b) applying pressure to the plurality of fluid channels in the microfluidic chip from the pressure source via the manifold.

* * * * *